United States Patent [19]
Kayserman et al.

[11] Patent Number: 5,952,822
[45] Date of Patent: Sep. 14, 1999

[54] METHOD AND APPARATUS FOR PROXIMITY SENSING IN THE PRESENCE OF AN EXTERNAL FIELD

[75] Inventors: Isak Kayserman, Needham; Simon Livson, Arlington, both of Mass.

[73] Assignee: Allen-Bradley Company, LLC, Milwaukee, Wis.

[21] Appl. No.: 08/738,957

[22] Filed: Oct. 24, 1996

[51] Int. Cl.$^6$ .............................. G01B 7/14; G01R 33/02
[52] U.S. Cl. .............................. 324/207.12; 324/207.26; 324/207.19
[58] Field of Search .................. 324/207.18, 207.19, 324/207.26, 207.12, 225, 236; 336/145, 220; 331/65; 307/116

[56] References Cited

U.S. PATENT DOCUMENTS

| | | | |
|---|---|---|---|
| 3,634,799 | 1/1972 | Strauch | 324/207.12 |
| 4,618,823 | 10/1986 | Dahlheimer et al. | |
| 4,719,362 | 1/1988 | Nest et al. | |
| 4,810,966 | 3/1989 | Schmall | 324/207.26 |
| 4,879,531 | 11/1989 | Tigges et al. | |
| 5,065,093 | 11/1991 | Nauta et al. | |
| 5,194,805 | 3/1993 | Nakajima et al. | 324/234 |
| 5,239,204 | 8/1993 | Mueller et al. | |
| 5,264,733 | 11/1993 | Tigges. | |
| 5,525,900 | 6/1996 | Larsen et al. | 324/207.19 |

FOREIGN PATENT DOCUMENTS

| | | |
|---|---|---|
| 0 304 272 | 8/1988 | European Pat. Off. |
| 3438998 | 4/1986 | Germany. |
| 3611862 | 10/1987 | Germany. |
| 3730113 | 3/1989 | Germany. |
| 3839386 | 5/1990 | Germany. |
| 4141264 | 3/1993 | Germany. |
| 4305385 | 8/1994 | Germany. |

*Primary Examiner*—Walter E. Snow
*Attorney, Agent, or Firm*—Patrick S. Yoder; John M. Miller; John J. Horn

[57] ABSTRACT

An inductive proximity sensor and a method of proximity sensing are described that permit targets of interest to be detected despite the presence of external magnetic fields due to AC or DC sources, such as resistive welding machines. The sensor has a pair of matched coils positioned adjacent to one another along a common central axis. The coils are coupled in series with oscillator and detecting circuitry, that also serves to drive a switching device. The coils are wound for current flow in opposite directions and produce oscillating electro-magnetic fields for detecting the targets in response to signals from the oscillator and detecting circuitry. Currents in the coils induced by strong external magnetic fields produces an additional components of the coil field which essentially cancel one another. The sensing field of the coil assembly may be shaped and directed by cooperation of the fields of the two coils and by appropriate shielding around one or both coils.

20 Claims, 4 Drawing Sheets

METHOD AND APPARATUS FOR PROXIMITY SENSING IN THE PRESENCE OF AN EXTERNAL FIELD

BACKGROUND OF THE INVENTION

The present invention relates generally to non-contact proximity sensors. In particular, the invention relates to an inductive proximity sensor including an oscillator coupled to a two-coil resonant system for reducing or eliminating interference effects of external magnetic fields.

Conventional inductive proximity switches are generally known for sensing the presence within a sensing region, of targets of interest, typically metallic parts and components. Such devices typically include an LC tuned oscillator for producing an oscillating electro-magnetic field around a sensing coil. When a target enters into and perturbs the electro-magnetic field sufficiently to alter the oscillating state of the field, such changes are amplified and result in generating a change in electrical signal. This change, in turn, causes a change in an output signal. Such proximity switches may typically be incorporated into various process controls and the switch interfaced with digital or analog control circuitry for providing the control circuitry with feedback indicative of the presence of the target within the sensing region of the coil. In conventional inductive proximity switches of this type, it is common practice to provide a ferrite core (such as having a T-shaped or E-shaped cross section) for the sensing coil to shape and extend the electro-magnetic field surrounding the coil in a sensing direction and to concentrate or channel the field in other directions, such as behind and to the sides of the coil.

While advances have been made in the design of proximity sensors, such as to improve their range and sensitivity, there remain important applications in which conventional proximity sensors do not perform well. For example, inductive proximity sensors would be useful in a number of applications where the switch must operate in the presence of a strong external magnetic field, such as in the vicinity of resistive welding machines and other equipment. However, such external magnetic fields may strongly influence the performance of the sensors, such as by causing the ferrite core to saturate, changing the sensitivity of the sensor and causing the output circuitry to malfunction, such as by remaining on due to the presence of the strong exernal field rather than of a target of interest. Moreover, other disadvantages with ferrite cores include degradation in their performance due to temperature, age and particular material properties, such as brittleness. Sensitivity in the presence of strong external magnetic fields generally requires more sophisticated and expensive solutions, such as the use of exotic ferrite materials for the core, additional electronic compensation circuitry, shielding and so forth.

There is a need, therefore, for an improved inductive proximity sensor capable of reducing the influence of external magnetic fields on its output state, thus permitting use of the sensor in factory and other application environments in which such fields are present. In particular, there is a need for such a sensor that is of relatively straightforward structure, preferably making use of elements common to existing sensors, but adapted to accommodate the special requirements of strong external magnetic field environments. Moreover, there is a need for an improved proximity sensor of the type described above that includes a structure for extending or shaping the sensing field without the need for a ferrite core.

SUMMARY OF THE INVENTION

In response to such needs, the invention features a novel technique for reducing the influence of external magnetic fields on the output state of inductive proximity sensors. In particular, the invention provides an inductive proximity sensor capable of performing adequately in the presence of such fields, resulting from both AC and DC sources and over a wide temperature range. The technique makes use of two self-similar coils with current flow in opposite directions and coupled to oscillation and switching circuitry in series. The coils are preferably resonantly matched and aligned coaxially to produce adjacent magnetic fields in response to signals from the oscillator. Because the instantaneous orientation of the induced current of the coils is in opposite directions, the influence of external magnetic fields is effectively cancelled by interaction of the fields of the coils. Targets entering into the sensing field of the coil adjacent to a sensing face of the sensor are then detected in a normal manner. The coils are preferably wound on a single bobbin and epoxy encapsulated prior to incorporation into the sensor. Moreover, the device may be designed to be unshielded, semi-shielded (i.e., partially shielded) and fully shielded. In all cases, shielding is provided adjacent to a second of the coils. In the latter two cases, shielding is extended to limit any influence of metallic mounting or housing components on the sensing coil of the device.

Thus, in accordance with a first aspect of the invention, an inductive proximity sensor is provided that includes an oscillator and detection circuit, an output circuit and a coil assembly. The oscillator and detection circuit generates an oscillating electrical signal and detects changes in the oscillating electrical signal resulting from the presence of a target of interest in proximity to the sensor. The output circuit is coupled to the oscillator and detection circuit, and changes its state in response to changes in the oscillating electrical signal detected by the oscillator and detecting circuit. The coil assembly is coupled to the oscillator and detecting circuit, and includes first and second transmitting and sensing coils. The current in the first transmitting and sensing coil flows in a first direction, while current in the second transmitting and sensing coil, which is coupled in series with the first coil, flows in a second direction opposite to the first direction. The first and second transmitting and sensing coils generate oppositely oriented electro-magnetic fields substantially cancelling influences of external magnetic fields and changing the oscillating electrical signal from the oscillator and detection circuit in response to presence within the oscillating magnetic fields of the target of interest. Because in the preferred embodiment no ferrite core is needed, sensitivity to DC magnetic fields is greatly reduced.

In accordance with another aspect of the invention, an inductive proximity sensor is provided that includes an oscillator and detection circuit, an output circuit, and first and second coils. The first coil is disposed around a central axis and wound such that current through it flows in a first direction. The first coil is coupled to the oscillator and detection circuit and generates a first electro-magnetic field in response to the oscillating electrical signal as well as to external magnetic fields. The first coil changes the oscillating electrical signal in response to presence in the first electro-magnetic field of a target of interest. Current in second coil flows in a second direction opposite to the first direction and is disposed adjacent to the first coil around the central axis. The second coil is coupled in series with the first coil and generates a second electro-magnetic field in response to the oscillating electrical signal and to the external magnetic fields. The second electro-magnetic field cooperates with the first electro-magnetic field to substantially cancel portions of the first and second electro-magnetic fields generated in response to the external magnetic fields.

The invention also provides a method for detecting presence of a target of interest in proximity to a sensing face in the presence of an external magnetic field. In accordance with the method, an oscillating electrical signal is generated and applied to a first coil wound for current flow in a first direction and positioned adjacent to the sensing face to generate a first electro-magnetic field. The first electro-magnetic field also includes a component resulting from the external magnetic field. The oscillating electrical signal is also applied to a second coil in series with the first coil to generate a second electro-magnetic field, the second coil being wound for current flow in a second direction opposite to the first direction. The second electro-magnetic field also includes a component resulting from the external magnetic field. The components of the first and second electro-magnetic fields resulting from the external magnetic field substantially cancel one another. The oscillating electrical signal is then monitored to identify changes in the oscillating electrical signal resulting from the presence of the target of interest in proximity to the sensing face.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
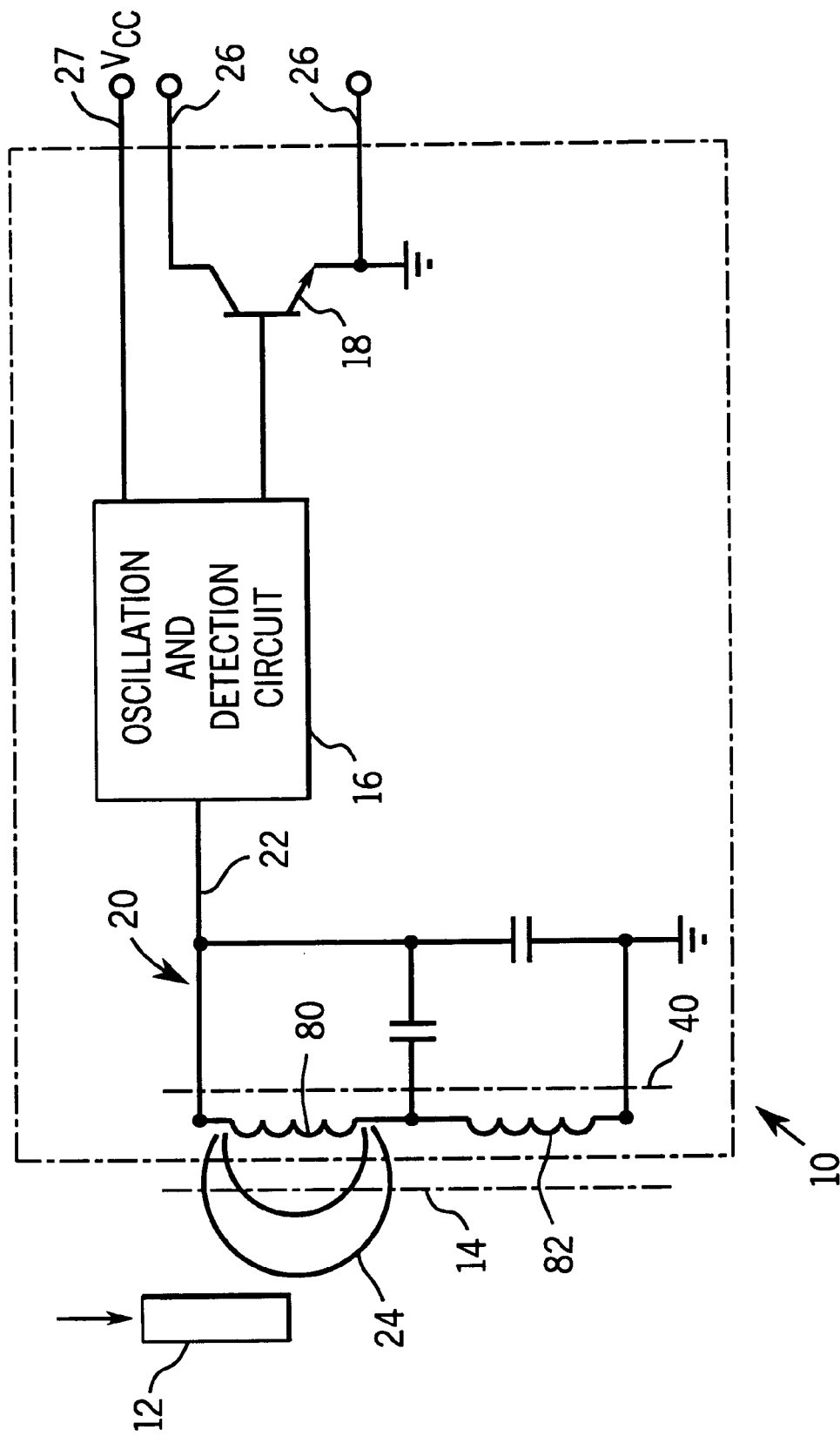
FIG. 1 is a diagrammatical view the principal components of a proximity sensor incorporating a dual-coil system for limiting interference effects of external magnetic fields.

Turning now to the drawings and referring to FIG. 1, an inductive proximity sensor 10 is illustrated diagrammatically for detecting the presence of a target of interest 12 in proximity to a sensing face 14. Sensor 10 includes an oscillator and detection circuit 16 coupled to an output device 18 and a coil assembly 20. Oscillator and detection circuit 16 preferably includes oscillator and demodulator circuitry and may include a threshold switch (not shown separately). In operation, circuit 16 generates a high frequency oscillating signal that is applied to a conductor 22 coupled to coil assembly 20. The oscillating signal produces an electro-magnetic field 24, as discussed in greater detail below, that extends beyond sensing face 14. When a target 12 enters into field 24, eddy currents resulting from field 24 produce a secondary field that draws energy from the resonant circuit of the coil assembly 20, reducing the amplitude of the oscillation accordingly. Changes in the oscillating state of the signal from circuit 16 are transmitted to a detection circuit and to the output. As a result of changes in the oscillating state, output device 18 changes its conducting state. When placed in service, leads 26 from output device 18 are coupled to control or monitoring circuitry (not shown), for which the operating state of device 18 is indicative of the presence or absence of a target 12. Oscillator and detection circuit 16, and output device 18 may be of any suitable type, generally known in the art. In the presently preferred embodiment, oscillator and detection circuit 16 includes an application specific integrated circuit, such as model TCA 505A, available commercially from Siemens AG. Moreover, sensor 10 is powered by current supplied by means of a power lead 27.

Figure 2A:
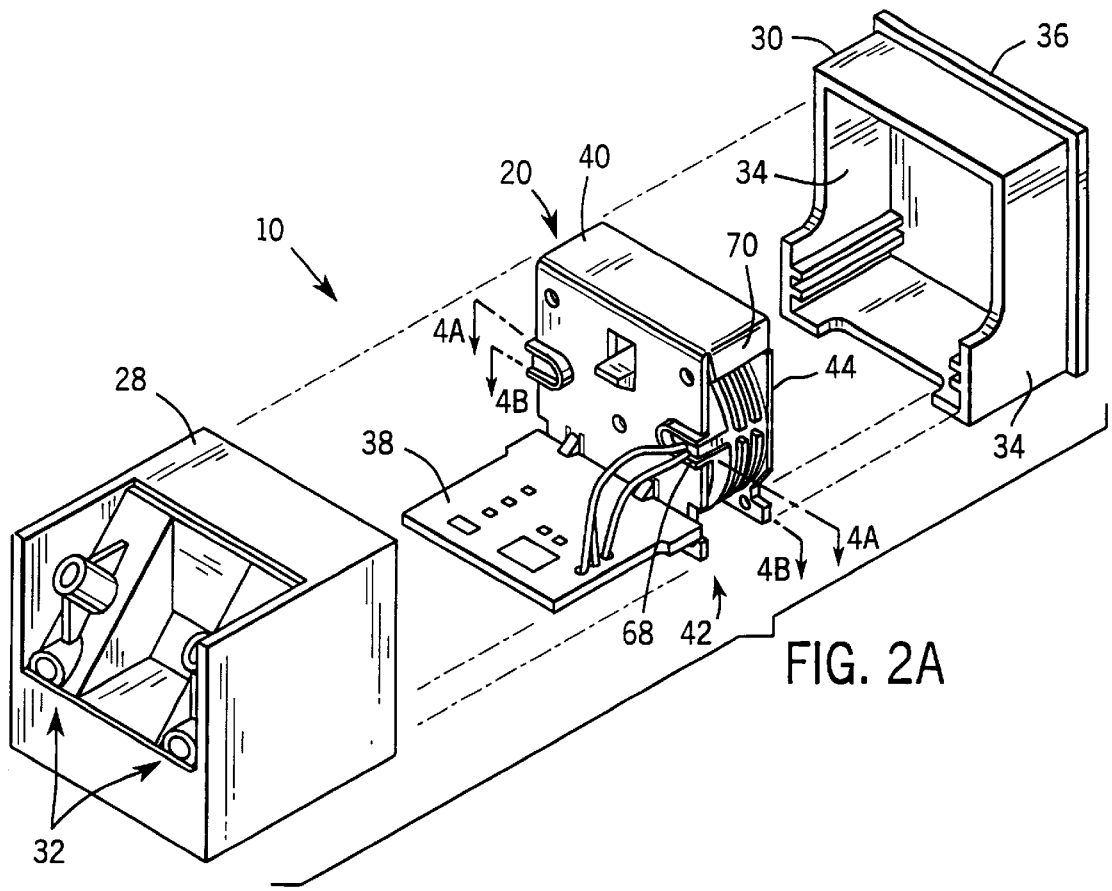
FIGS. 2A and 2B are exploded perspective views of a typical proximity sensor incorporating the dual-coil system of FIG. 1, in accordance with a preferred embodiment of a dual-coil bobbin (shown for clarity with mounting features turned upwards)
Figure 2B:
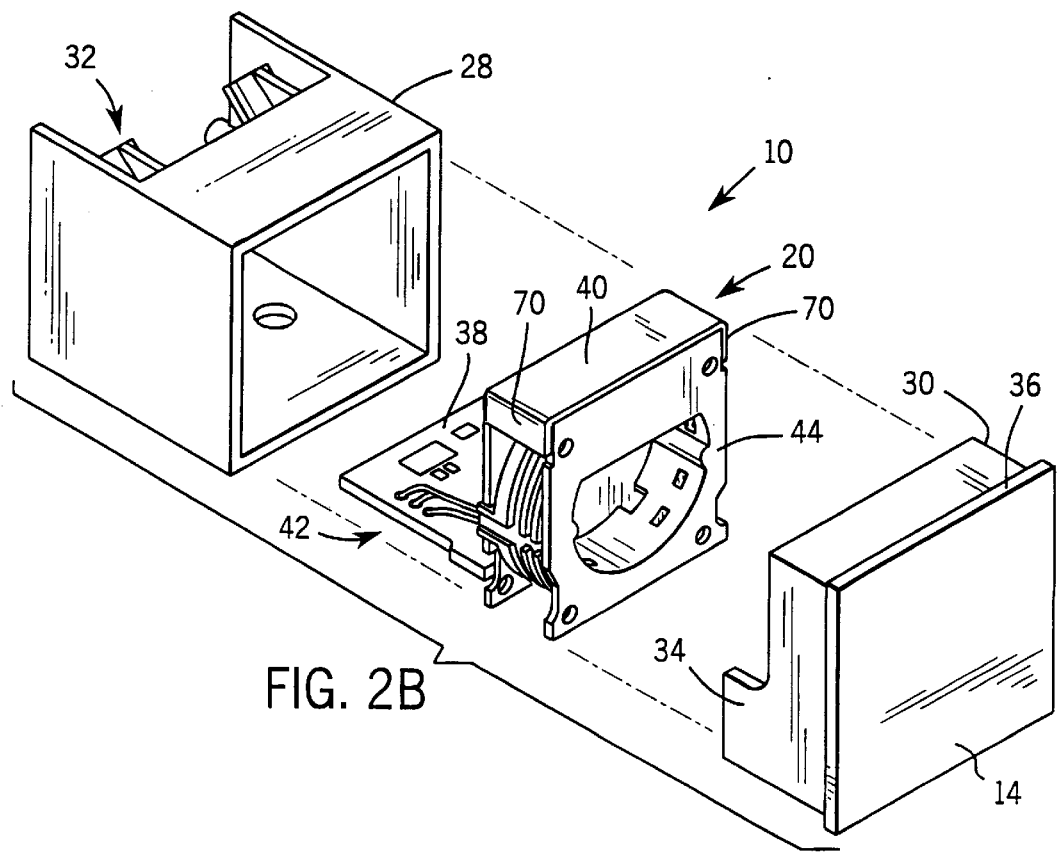
Figure 3:
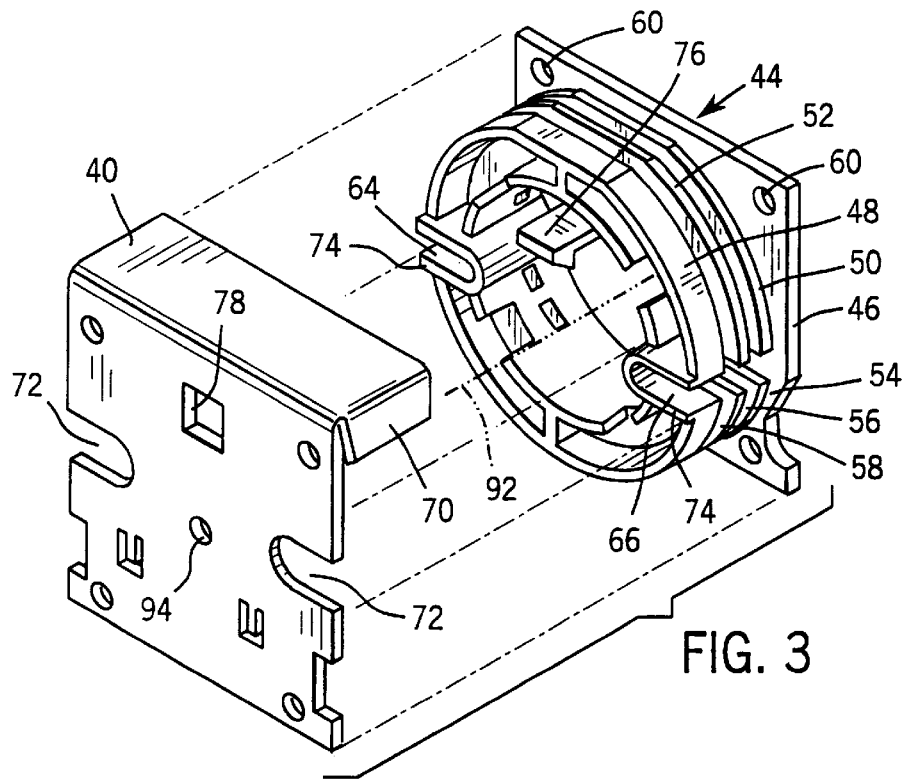
FIG. 3 is an exploded perspective view of the bobbin and shield shown in FIGS. 2A and 2B, wherein the coil windings have been removed to illustrate the preferred structure of the bobbin.

A presently preferred structure for sensor 10 is illustrated in FIGS. 2A and 2B. In this embodiment, the sensor circuitry described above is housed in an enclosure 28 and covered by a cap 30 permanently secured to enclosure 28 during assembly of the sensor. Enclosure 28 includes mounting features, designated generally by the reference numeral 32, that preferably permit sensor 10 to be mounted in several different sensing positions in a manner generally known in the art. Cap 30 includes lateral side walls 34 extending from sensing face 14, forming a cavity in which coil assembly 20 is housed as described below. Side walls 34 of cap 30 are appropriately dimensioned to slide into enclosure 28 during assembly. A peripheral flange 36 surrounding sensing face 14 permits cap 30 to be sealingly secured to enclosure 28.

The sensor circuitry, including oscillator and detection circuit 16 is preferably supported on a printed circuit board 38. Circuit board 38 is, in turn, supported on a shield 40 and electrically coupled to coil assembly 20 to form a complete subassembly 42. Subassembly 42 is coupled to a pin connector (not shown) via a multi-strand conductor (not shown) for interfacing sensor 10 with external control or monitoring circuitry in a manner well known in the art. Shield 40, which is preferably formed of a conductive metal, such as brass or copper, also includes features for locating and supporting coil assembly 20 as described in more detail below. Also as described below, shield 40 serves to channel a portion of the magnetic flux of the fields generated by coil assembly 20 to limit the influence of mounting hardware or other machine elements supporting sensor 10. As will be appreciated by those skilled in the art, where such hardware is made of a material that will influence operation of sensor 10, or where alternative shielding structures are provided in sensor 10, shield 40 may be modified and subassembly 42 constructed in an alternative manner to adequately support circuit board 38 and coil assembly 20.

As best illustrated in FIGS. 2A and 2B, 3, and 4A and 4B, coil assembly 20 preferably includes a single-piece plastic bobbin 44 having a front flange 46, a rear flange 48 and two partitions 50 and 52 dividing the space between front and rear flanges 46 and 48 into three annular recesses 54, 56 and 58, respectively. Front flange 46 includes a series of locating holes 60 that engage corresponding pins (not shown) in cap 30 during assembly. Rear flange 48 includes lateral grooves 64 and 66. One of the lateral grooves 64 includes a series of protrusions 68 (see FIG. 2A) designed to engage and locate conductors coupling coil assembly 20 to circuit board 38.

Bobbin 44 is preferably configured for convenient attachment to shield 40 to ease assembly of sensor 10. In particular, shield 40 includes side flanges 70 that reduce the side sensitivity of the sensor to metal mounting hardware. Moreover, shield 40 has a pair of generally U-shaped recesses 72 that receive extensions 74 from rear flange 48 around grooves 64 and 66. Finally, a rearwardly extending, flexible locking tab 76 is provided on bobbin 44 for entering into a corresponding aperture 78 in shield 40. Locking tab 76 includes an abutment surface designed to contact shield 40 and retain bobbin 44 in place adjacent to shield 40.

Figure 4A:
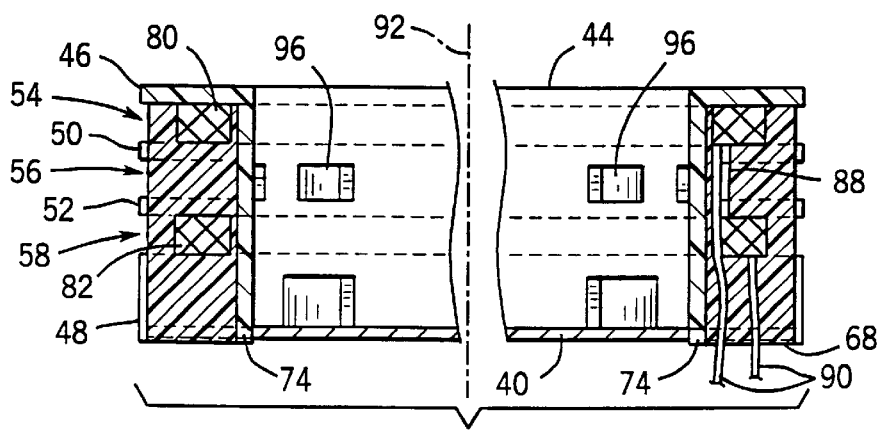
FIGS. 4A and 4B are sectional views of the bobbin and windings through lines 4A—4A and 4B—4B of FIG. 2, respectively.
Figure 4B:
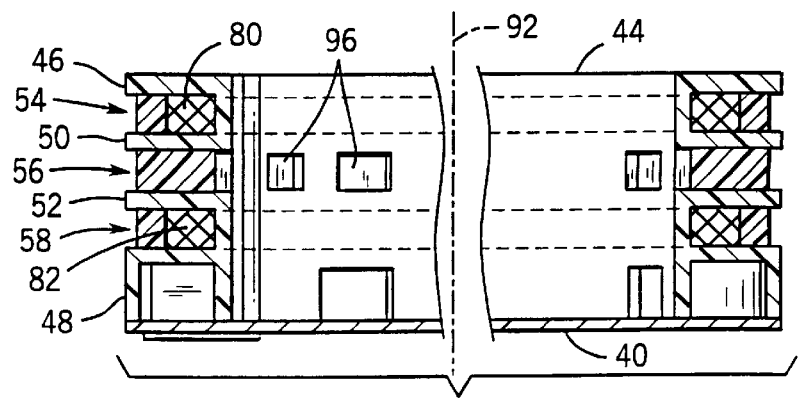

Considering in greater detail the preferred structure of coil assembly 20, as best shown in FIGS. 4A and B, and 5D–D, assembly 20 includes a first coil 80 wound within forward annular recess 54, and a second coil 82 wound within rear annular recess 58. First and second coils 80 and 82 are wound such that current through the coils flows in opposite directions, as indicated by arrows 84 and 86 in FIGS. 5A–D. Coils 80 and 82 are coupled in series via a jumper 88 traversing intermediate annular recess 56. Ends 90 of the conductor comprising the coils pass through groove 64 and are retained in place by protrusions 68. Extension 74 surrounding groove 64 in the vicinity of shield 40 prevent contact of ends 90 with shield 40. Ends 90 of the conductor are coupled to printed circuit board 38 as best illustrated in FIGS. 2A and B. First and second coils 80 and 82 are thus axially spaced by intermediate annular recess 56 along a central axis of bobbin 44, designated by the reference numeral 92 in FIGS. 3, and 4A and B. Moreover, coils 80 and 82 are preferably of identical dimensions and include the same number of turns so as to resonantly match the coils for reduction or elimination of influences of external magnetic fields as discussed below.

Once coils 80 and 82 are wound on bobbin 44, the entire stucture is preferably encapsulated in a non-conductive material, such as epoxy. To facilitate such encapsulation, shield 40 includes an injection aperture 94 (see FIG. 3), while bobbin 44 has a series of apertures 96 at the base of intermediate annular recess 56. Coil assembly 20 is encapsulated by placing the completed assembly into cap 30 and injecting the encapsulating material through aperture 94 in shield 40. The encapsulating material then fills the interior of bobbin 44 (shown void in the FIGURES for explanatory purposes) and exits through apertures 96 of recess 56. The material then flows through recess 56 and fills cap 30 and recesses 54 and 58, covering and encapsulating coils 80 and 82.

When an oscillating electrical signal is applied to coils 80 and 82 by circuit 16, magnetic fields 24 and 25 are induced around the coils as best illustrated in FIGS. 5A–5D. As will be appreciated by those skilled in the art, because first and second coils 80 and 82 are resonantly matched and wound such that current through them flows in opposite directions, the orientations of the induced fields around coils 80 and 82 at any given time are opposite to one another. When an external electro-magnetic field is present in the vicinity of the coils, eddy currents are induced in the coils by virtue of the external field, resulting in an additional component of their electro-magnetic fields. However, due to the close proximity of the coils and to their self similarity, the components of their magnetic fields owing to the external field-induced eddy currents act to cancel one another. The remaining components of the coil fields thus act to detect targets 12 when fields induced in such targets alter the oscillating state of the fields both in the presence of external electro-magnetic fields as well as when such fields are not present.

Figure 5A:
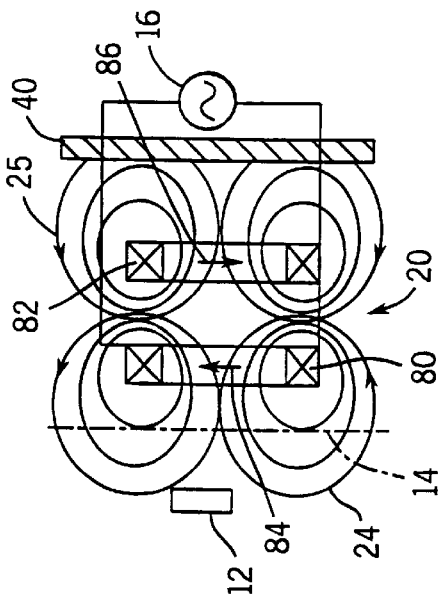
FIGS. 5A–5D are diagrammatical views of the dual-coil proximity sensor of FIGS. 1 and 2, illustrating how the dual-coil system reduces the influence of external magnetic fields on the sensitivity of the device and may be shielded in various configurations.
Figure 5B:
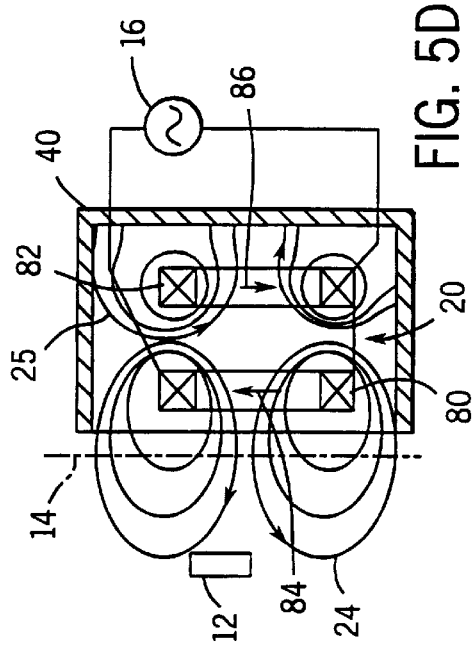
Figure 5C:
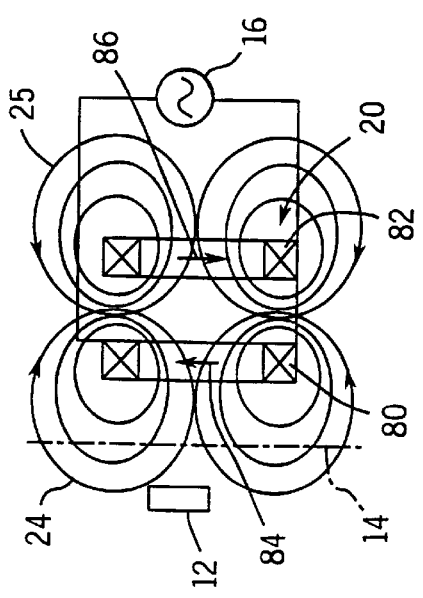
Figure 5D:
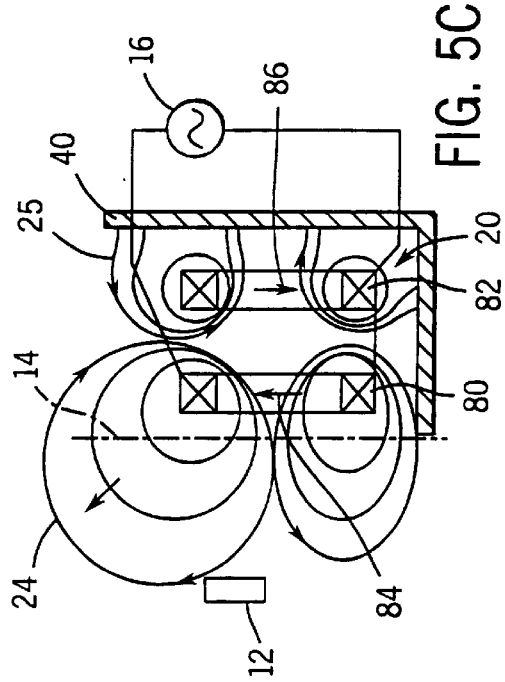

Depending upon the particular mounting structure and desired sensing direction of sensor 10, shielding may be provided around coil assembly 20 as illustrated in FIGS. 5A–5D. In particular, as shown in FIG. 5A, coil assembly 20 may be unshielded, resulting in extension of sensing fields 24 and 25 on either side of coil assembly 20. To extend the field in one direction towards the target and thus increasing the sensing range, and to reduce the influence of metal parts behind the coil assembly, a partial shield 40 may be provided behind second coil as illustrated in FIG. 5B. Shield 40 has the effect of channeling portions of the oscillating electromagnetic field around coil 82, and thus limiting the extension and preventing false switching due to objects behind shield 40. As shown in FIGS. 5C and 5D, in a similar manner, a partial or full shield 40 may be provided both behind and on one or more sides of coil assembly 20, shaping and directing field 24 and further reducing the influence of objects around coil assembly 20 other than in the desired direction of sensing. As will be appreciated by those skilled in the art, the cooperation of fields 24 and 25 surrounding coils 80 and 82, respectively, thus provides for shaping, directing and extending of the sensing field without recourse to a ferrite core of the type found in conventional proximity sensors. This shaping and directing function is further enhanced by shield 40. Sensor 10 is therefore able to properly sense targets in the presence of external magnetic fields, while avoiding difficulties, such as saturation, associated with the use of ferrite cores, or special signal processing to eliminate the influence of such fields.

While the embodiments illustrated in the FIGURES and described above are presently preferred, it should be understood that these embodiments are offered by way of example only and may be adapted to various other structures. For example, the particular physical configuration of coil assembly 20 and enclosure 28 may be modified to accommodate particular mounting and environmental constraints of various applications. All such variations should be considered as falling within the intended scope of the present invention to the extend covered by the appended claims.

What is claimed is:

1. An inductive proximity sensor comprising:

an oscillator and detection circuit, the oscillator and detection circuit generating an oscillating electrical signal and detecting changes in the oscillating electrical signal;

an output circuit coupled to the oscillator and detection circuit, the output circuit being configured to change conducting state in response to changes in the oscillating electrical signal detected by the oscillator and detecting circuit; and a coil assembly coupled to the oscillator and detecting circuit, the coil assembly including a first transmitting and sensing coil wound for current flow in a first direction and a second transmitting and sensing coil in series with and coaxial to the first coil and wound for current flow in a second direction opposite to the first direction, the first and second coils being wound on a non-magnetic bobbin in respective first and second positions axially displaced from one another, the first and second transmitting and sensing coils generating oppositely oriented first and second electro-magnetic fields, respectively, the first and second electro-magnetic fields interacting with one another and substantially cancelling influences of external magnetic fields and changing the oscillating electrical signal from the oscillator and detection circuit in response to presence within the electro-magnetic fields of a target of interest.

2. The inductive proximity sensor of claim 1, wherein the first and second sensing and transmitting coils are disposed in axially spaced relation with respect to one another along a common axis.

3. The inductive proximity sensor of claim 2, wherein the first and second sensing and transmitting coils are wound on a single bobbin, the bobbin being divided into at least a first and a second annular coil receiving regions spaced axially along the common axis from one another, the first and second sensing and transmitting coils being disposed in the first and second coil receiving regions, respectively.

4. The inductive proximity sensor of claim 3, wherein the bobbin includes an annular intermediate region lying between the first and second coil receiving regions, the intermediate region including apertures for permitting flow of an encapsulating material around the first and second coils.

5. The inductive proximity sensor of claim 1, wherein the first and second coils each include an equal number of turns.

6. The inductive proximity sensor of claim 1, further including a shield disposed adjacent to the coil assembly, the shield at least partially channelling flux from the electromagnetic field generated by the first and second transmitting and sensing coils.

7. An inductive proximity sensor, comprising:

an oscillator and detection circuit, the oscillator and detection circuit generating an oscillating electrical signal and detecting changes in the oscillating electrical signal;

an output device coupled to the oscillator and detection circuit, the output device being configured to change its conducting state in response to changes in the oscillating electrical signal detected by the oscillator and detecting circuit;

a coil assembly including a first coil wound on a non-magnetic bobbin for current flow in a first direction and disposed around a central axis in a first axial position, the first coil being coupled to the oscillator and detection circuit and generating a first electro-magnetic field in response to the oscillating electrical signal and to external magnetic fields, the first coil changing the oscillating electrical signal in response to presence in the first electro-magnetic field of a target of interest, and a second coil wound on a non-magnetic bobbin for current flow in a second direction opposite to the first direction and disposed adjacent to the first coil around the central axis in a second axial position displaced from the first axial position, the second coil being coupled in series with the first coil and generating a second electro-magnetic field in response to the oscillating electrical signal and to the external magnetic fields, the second electro-magnetic field cooperating with the first electro-magnetic field to substantially cancel portions of the first and second electro-magnetic fields generated in response to the external magnetic fields; and a shield disposed adjacent to the coil assembly for at least partially channeling flux from electro-magnetic fields generated by the coil assembly.

8. The inductive proximity sensor of claim 7, wherein the first and second coils each include an equal number of turns.

9. The inductive proximity sensor of claim 7, wherein the first and second coils are wound on a single bobbin, the bobbin being divided into at least a first and a second annular coil receiving regions spaced axially along the central axis from one another, the first and second coils being disposed in the first and second coil receiving regions, respectively.

10. The inductive proximity sensor of claim 9, wherein the bobbin includes an annular intermediate region lying between the first and second coil receiving regions, the intermediate region including apertures for permitting flow of an encapsulating material around the first and second coils.

11. The inductive proximity sensor of claim 7, wherein the shield is disposed adjacent to the second coil, the shield at least partially channeling flux from the electro-magnetic fields generated by the first and second coils.

12. A method for detecting presence of a target of interest in proximity to a sensing face in the presence of an external magnetic field, the method comprising the steps of:

(a) generating an oscillating electrical signal;

(b) applying the oscillating electrical signal to a first coil wound on a non-magnetic bobbin in a first axial position for current flow in a first direction and positioned adjacent to the sensing face to generate a first electro-magnetic field, the first electro-magnetic field also including a component resulting from the external magnetic field;

(c) applying the oscillating electrical signal to a second coil in series with the first coil to generate a second electro-magnetic field, the second coil being wound on a non-magnetic bobbin in a second axial position displaced form the first axial position and in series with and coaxial to the first coil for current flow in a second direction opposite to the first direction, the second electro-magnetic field also including a component resulting from the external magnetic field, the components of the first and second electro-magnetic fields resulting from the external magnetic field substantially canceling one another; and (d) monitoring the oscillating electrical signal to identify changes in the oscillating electrical signal resulting from the presence of the target of interest in proximity to the sensing face.

13. The method of claim 12, wherein the first and second coils are disposed adjacent to one another along a common axis.

14. The method of claim 12, wherein the second coil is coupled in series with the first coil.

15. The method of claim 12, including the further step of shielding at least a portion of the first and second electro-magnetic fields to limit extension of the electro-magnetic fields in a direction away from the sensing face.

16. The inductive proximity sensor of claim 6, wherein the shield is disposed adjacent to at least two sides of the coil assembly.

17. The inductive proximity sensor of claim 6, wherein the shield is disposed adjacent to at least three sides of the coil assembly.

18. The inductive proximity sensor of claim 7, wherein the shield is disposed adjacent to at least two sides of the coil assembly.

19. The inductive proximity sensor of claim 7, wherein the shield is disposed adjacent to at least three sides of the coil assembly.

20. The method of claim 15, wherein the step of shielding includes channeling flux along at least two sides of the coils via a shielding element extending adjacent to at least two sides of the coils.

* * * * *